United States Patent
Zeljko et al.

(10) Patent No.: US 9,426,182 B1
(45) Date of Patent: Aug. 23, 2016

(54) CONTEXT-BASED AUTHENTICATION OF MOBILE DEVICES

(71) Applicant: Workspot, Inc., San Jose, CA (US)

(72) Inventors: Robert Zeljko, San Jose, CA (US); Puneet Chawla, Fremont, CA (US); Christopher N. Thomas, Kernville, CA (US); Amitabh Sinha, San Jose, CA (US); Yatin Vasavada, San Jose, CA (US); Abhijeet Kumar, Mountain View, CA (US); Guang Yuan Li, Palo Alto, CA (US)

(73) Assignee: Workspot, Inc., Cupertino, CA (US)

( * ) Notice: Subject to any disclaimer, the term of this patent is extended or adjusted under 35 U.S.C. 154(b) by 0 days.

(21) Appl. No.: 14/149,425

(22) Filed: Jan. 7, 2014

Related U.S. Application Data

(60) Provisional application No. 61/749,670, filed on Jan. 7, 2013, provisional application No. 61/749,676, filed on Jan. 7, 2013.

(51) Int. Cl.
| | |
|---|---|
| H04L 29/06 | (2006.01) |
| G06F 21/44 | (2013.01) |
| G06F 21/62 | (2013.01) |
| H04L 29/08 | (2006.01) |

(52) U.S. Cl.
CPC ............... *H04L 63/20* (2013.01); *G06F 21/44* (2013.01); *G06F 21/62* (2013.01); *H04L 63/08* (2013.01); *H04L 63/107* (2013.01); *H04L 67/327* (2013.01)

(58) Field of Classification Search
CPC ....... H04L 63/20; H04L 63/08; H04L 63/107; H04L 67/327; G06F 21/44; G06F 21/62
See application file for complete search history.

(56) References Cited

U.S. PATENT DOCUMENTS

| | | | | |
|---|---|---|---|---|
| 8,613,070 | B1 * | 12/2013 | Borzycki | G06F 21/6218 726/8 |
| 8,805,951 | B1 * | 8/2014 | Faibish | G06F 9/5072 709/213 |
| 2006/0236369 | A1 * | 10/2006 | Covington et al. | 726/1 |
| 2008/0172715 | A1 * | 7/2008 | Geiger et al. | 726/1 |
| 2009/0165078 | A1 * | 6/2009 | Samudrala | G06F 21/604 726/1 |
| 2010/0161967 | A1 * | 6/2010 | Roegner | 713/155 |
| 2011/0277027 | A1 * | 11/2011 | Hayton | H04L 63/0815 726/8 |
| 2011/0289554 | A1 * | 11/2011 | Kahandaliyanage | G06F 9/468 726/1 |
| 2011/0314261 | A1 * | 12/2011 | Brucker et al. | 712/207 |
| 2011/0321117 | A1 * | 12/2011 | Nestler et al. | 726/1 |
| 2012/0117363 | A1 * | 5/2012 | Cummings | H04W 8/22 713/1 |

(Continued)

*Primary Examiner* — Joseph P Hirl
*Assistant Examiner* — J. Brant Murphy
(74) *Attorney, Agent, or Firm* — Fenwick & West LLP

(57) ABSTRACT

A system and method are disclosed for adaptive authentication. An access control system stores policies for an enterprise, where each policy specifies a type of access control. The type of access control includes one or more security rules, which may specify authentication procedures, allowable behaviors, or both. The access control system stores a mapping from contexts of requests to interact with applications and access control policies. When a user requests access to an application associated with the enterprise via a client, the access control system receives the context of the request. The access control system selects an access control policy for the context of the request. The access control system sends access control information from the access control policy selected to the client. The client interacts with the user to perform the authentication.

18 Claims, 8 Drawing Sheets

(56) References Cited

U.S. PATENT DOCUMENTS

| | | | | |
|---|---|---|---|---|
| 2012/0246731 A1* | 9/2012 | Blaisdell | G06F 21/54 | 726/26 |
| 2013/0239175 A1* | 9/2013 | Sigurdson | G06F 21/35 | 726/3 |
| 2013/0247162 A1* | 9/2013 | Menon et al. | | 726/7 |
| 2013/0268667 A1* | 10/2013 | Abuelsaad | G06F 21/57 | 709/225 |
| 2014/0040979 A1* | 2/2014 | Barton | H04L 63/20 | 726/1 |
| 2014/0157380 A1* | 6/2014 | Abrams et al. | | 726/7 |
| 2015/0135258 A1* | 5/2015 | Smith | G06F 21/45 | 726/1 |

\* cited by examiner

FIG. 4

CONTEXT-BASED AUTHENTICATION OF MOBILE DEVICES

CROSS REFERENCE TO RELATED APPLICATIONS

This application claims the benefit of U.S. Provisional Application No. 61/749,670, filed Jan. 7, 2013, and U.S. Provisional Application No. 61/749,676, filed Jan. 7, 2013, which are incorporated by reference in their entirety.

BACKGROUND

1. Field of Art

This disclosure relates generally to managing client authentication, and in particular to adaptive authentication of client devices based on context.

2. Description of the Related Art

The delivery, management, and security of enterprise applications often rely upon employees using client devices that are purchased, provisioned, and managed by information technology (IT) departments. Conventionally, enterprise IT departments have been responsible for purchasing, provisioning, securing, and managing laptop or desktop computers for their employees. Furthermore, conventionally most applications used by the employees are maintained by the IT departments and hosted by servers within the enterprise.

However, user devices are increasingly employee-owned with a trend towards increase in BYOD (bring your own device) policy. Furthermore, applications are increasingly being managed in the cloud as SaaS (software as a service) applications. As a result, IT has less control over the client devices used by employees as well as applications of the enterprise. Conventional IT (information technology) management techniques are equipped to support and maintain client devices that are purchased by the IT departments and applications that are run using servers maintained by the IT departments. Therefore, current IT management techniques are not properly equipped to maintain a heterogeneous environment where the various components of the environment are not under control of the IT departments of enterprises.

SUMMARY

Described embodiments allow adaptive authentication of client devices. An access control system manages access control for requests sent by client devices to applications associated with an enterprise. The access control system stores access control policies. The access control system maps contexts of requests sent to the applications to access control policies. A context specifies attributes describing a request received from a client device, for example, a location of the client device sending the request. When the access control system receives a request to access an application, the access control system determines the context of the request. The access control system selects an access control policy that maps to the context. The access control system sends access control information from the selected access control policy to the client device for authenticating access to the requested application.

In some embodiments, the context comprises attributes including a client device type, a time of the request, the application to which the request is sent, the type of request, or a parameter of the request. An application may be associated with an enterprise. The application may be hosted within a data center of the enterprise or hosted as a software as a service (SaaS) application.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIG. 4 is a user interface for defining or editing an access control policy, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1A:
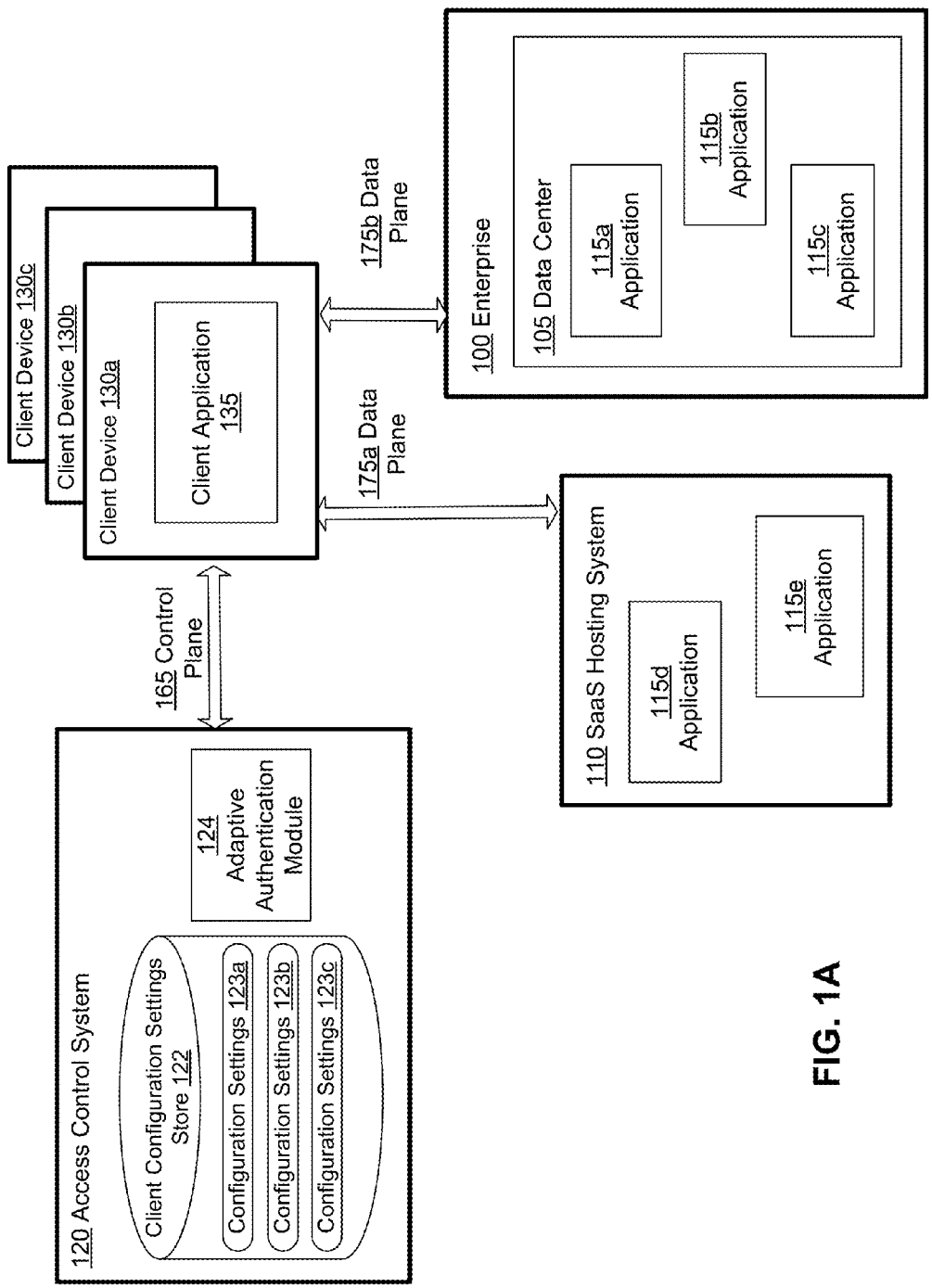
FIGS. 1A-1C are high-level block diagrams illustrating various embodiments of an environment for adaptive authentication.
Figure 1B:
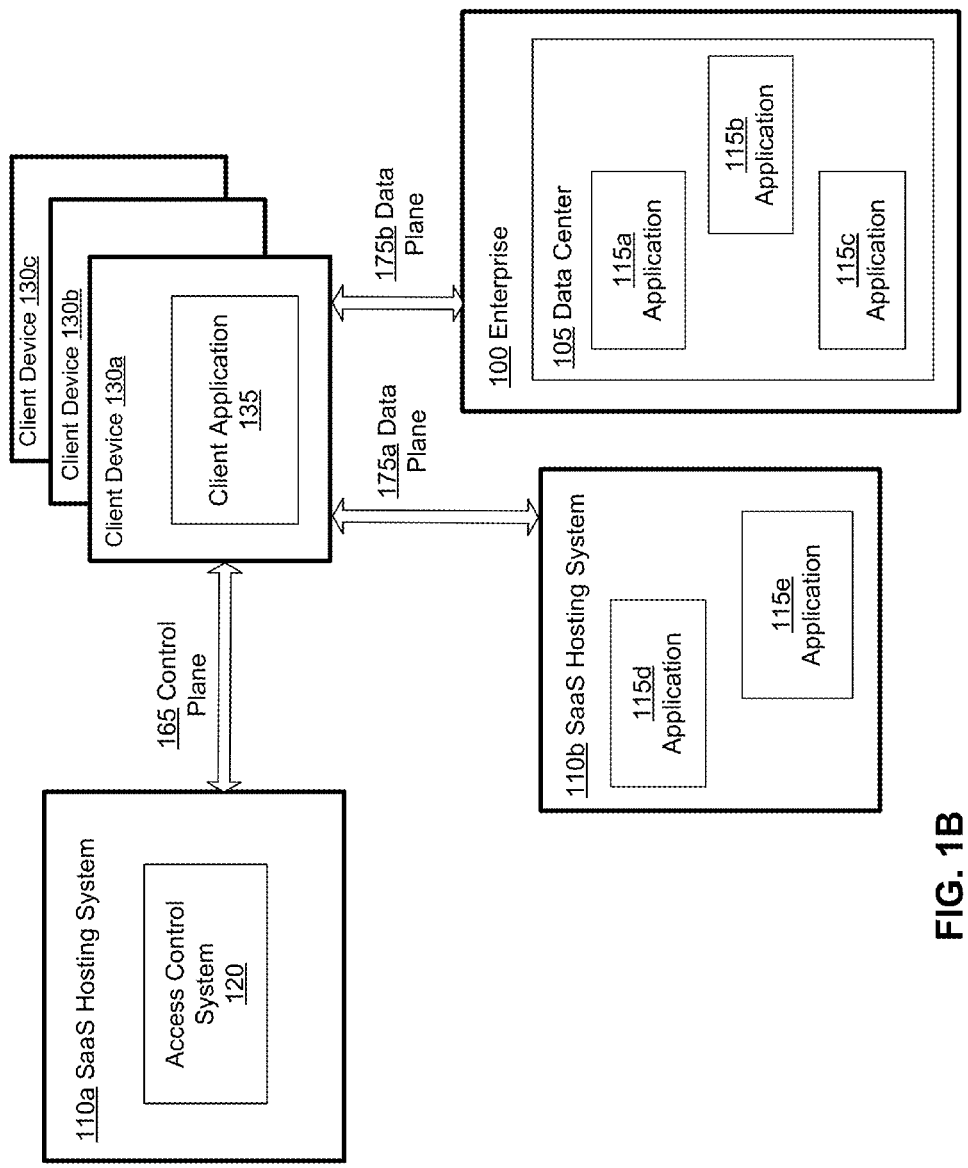
Figure 1C:
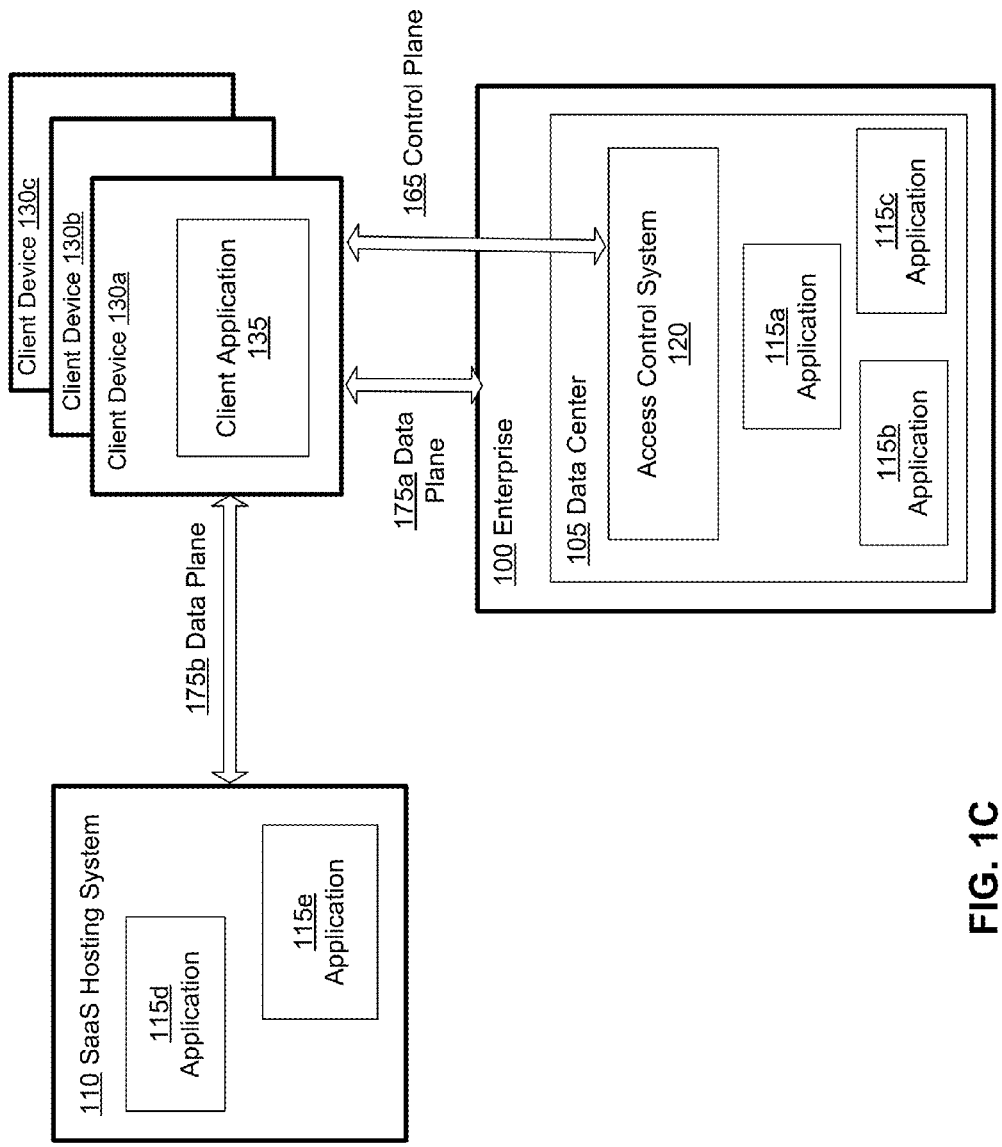

FIGS. 1A-1C are high-level block diagrams illustrating various embodiments of an environment for adaptive authentication. In one embodiment, the environment comprises one or more enterprises 100, one or more software-as-a-service (SaaS) hosting systems 110, one or more access control systems 120, and a plurality of client devices 130. The client device 130 allows users to use applications 115 of the enterprise 100 as well as the SaaS applications 115. Other embodiments may have additional or fewer entities than those illustrated in FIG. 1, or may distribute functionality differently among the entities.

The enterprise 100 allows users of the client devices 130 to access applications 115 associated with the enterprise 100. These include applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with the enterprise 100 may include productivity applications, for example, word processing applications, search applications, document viewers, collaboration applications. Applications associated with the enterprise 100 may also include applications that allow communication between people, for example, email, messaging, web meetings, and so on. An enterprise is also referred to herein as a company.

The applications 115 associated with the enterprise may be hosted within data centers 105 that are managed by the enterprise. A data center 105 comprises servers that host various applications 115 for the enterprise. A data center 105 typically comprises IT infrastructure that is managed by IT personnel of the enterprise. The IT infrastructure may include servers, network infrastructure, software, and so on. If there is an issue related to an application reported by a user, the IT personnel can check the health of the infrastructure used by the application.

In general, IT personnel control the management of the IT infrastructure of the data centers 105. Furthermore, one embodiment of the data center 105 includes a firewall to control access to the applications 115 hosted by the data center 105. The firewall enables computing devices behind the firewall to access the applications 115 hosted by the data center, but prevents computing devices outside the firewall from directly accessing the applications 115. The firewall may allow devices outside the firewall to access the applications 115 within the firewall using a virtual private network (VPN). Users associated with the enterprise 100 (e.g., employees of the enterprise) use login credentials to access the applications 115 in the data center 105.

An application 115 may be a SaaS application that is hosted by a third party system, for example, the SaaS hosting system 110. SaaS applications may be considered as being hosted in the cloud. As shown in FIG. 1, applications 115d and 115e are hosted by the SaaS hosting system 110. SaaS applications may be accessed by the client devices 130 using a user interface, for example, a user interface of client application 135. The SaaS hosting system 110 is managed by a vendor that is typically independent of the IT department of the enterprise 100. Users often use different login credentials to access the applications hosted by the SaaS hosting system 110 than to access the applications hosted by the enterprise 100. Moreover, the applications 115 hosted by the SaaS hosting system 110 may have different security policies than the applications hosted by the enterprise 100.

Users use the client device 130 to access the applications 115. The client device 130 may be any device having computing and network functionality, such as a laptop computer, desktop computer, smartphone, or tablet. The client device 130 executes a client application 135 for communicating with the enterprise 100 and SaaS hosting system 110 to access the applications 115 over a data plane 175. To access the applications 115, a user opens and/or logs in to the client application 135. The client application 135 authenticates user access to the applications 115 when the client device 130 is outside a firewall of the enterprise 100. The client application 135 authenticates access to a requested application by sending login credentials to the data center 105 or SaaS hosting system 110. If access is authenticated, the client application 135 displays application data to the user. The client application 135 may also provide access to the applications 115 while the client device 130 is behind the firewall of the enterprise 100, or the client device 130 may execute one or more programs to access the applications 115 hosted by the enterprise 100 or the SaaS hosting system 110 while the client device 130 is behind the firewall.

The access control system 120 manages communications between the client application 135, enterprise 100, and SaaS hosting system 110. In the embodiment illustrated in FIG. 1A, the access control system 120 is external to the enterprise 100 and the SaaS hosting system 110. FIG. 1B illustrates an embodiment in which the access control system 120 is hosted by a SaaS hosting system 110a. FIG. 1C illustrates an embodiment in which the access control system 120 is hosted by the data center 105 of the enterprise 100.

As illustrated in FIG. 1A, the access control system 120 communicates with the client application 135 via a control plane 165. The control plane 165 refers to information exchanged between the access control system 120 and client devices 130 that provide useful information for managing authentication to the applications 115. This is in contrast with the data plane 175, which comprises interactions between the client devices and the applications 115 hosted by the data centers 105 of the enterprise or by the SaaS hosting system 110. The interactions of the data plane 175 include the requests and response from the applications 115. Embodiments allow access control of client devices using information obtained from the control plane 165 rather than requiring the access control system 120 to necessarily operate within the data plane 175.

When a user requests access to an application 115, the client application 135 sends the request to the access control system 120. The access control system 120 determines an address of the requested application and a type of access control for the client application 135 based on a context of the request. The context is a set of variable factors associated with a particular application access request. In one embodiment, the context includes an identifier of the application being requested, the location of the client device 130 when the user requested access, and the time of the access request. Other factors that may be included in the context are the enterprise or company for which the device is being used, the type of network used by the client device, the client device type, the type of request for the application, or the type of parameters provided to a request. Using security policies associated with the enterprise 100 with which the user is associated, the access control system 120 determines the type of access control required for the user to access the requested application.

A level of security applied to the applications 115 may vary depending on the context in which the client application 135 is operated. For example, a client application 135 operated from one location (e.g., a secured home network) may require less security than a client application 135 operated from a different location (e.g., an unsecured network in a foreign country). To ensure secure access to the application 115 across a plurality of contexts while reducing inconvenience to the user, the access control system 120 applies different security policies depending on the context of the client application 135. In one embodiment, the access control system 120 includes a client configuration settings store 122 and an adaptive authentication module 124.

The client configuration settings store 122 stores configurations settings 123 for each client device 130. The configuration settings 123 include information specifying how the client application 135 is to establish communication with the applications 115, such as an address of a firewall of the enterprise 100, names and URLs of the applications 115, and authentication settings of the client application 135. In one embodiment, the configuration settings 123 further include a contextual model of a corresponding client application 135, indicating typical contexts of the client application 135. For example, a contextual model may identify an application commonly accessed by a user from a certain location at a certain time of day. In this case, the access control system 120 may use the contextual model to determine access control.

The adaptive authentication module 124 determines types of access control for the applications 115 based on contexts of the client application 135. The adaptive authentication module 124 stores policies for the enterprise 100, which specify the type of access control for each of a plurality of contexts. When a user requests access to an application 115, the adaptive authentication module 124 determines the context based on information received from the client application 135 and identifies the policy corresponding to the determined context. The adaptive authentication module 124 is described in further detail with respect to FIG. 3.

Systems and applications shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc.

The interactions between the client devices 130, the access control system 120, enterprise 100, and the SaaS hosting system 110 are typically performed via a network, for example, via the internet. In one embodiment, the network uses standard communications technologies and/or protocols. In another embodiment, the entities can use custom and/or dedicated data communications technologies instead of, or in addition to, the ones described above. Depending upon the embodiment, the network can also include links to other networks such as the Internet.

FIG. 1 and the other figures use like reference numerals to identify like elements. A letter after a reference numeral, such as "115*a*," indicates that the text refers specifically to the element having that particular reference numeral. A reference numeral in the text without a following letter, such as "115," refers to any or all of the elements in the figures bearing that reference numeral (e.g. "115" in the text refers to reference numerals "115*a*" and/or "115*b*" in the figures).

Figure 2:
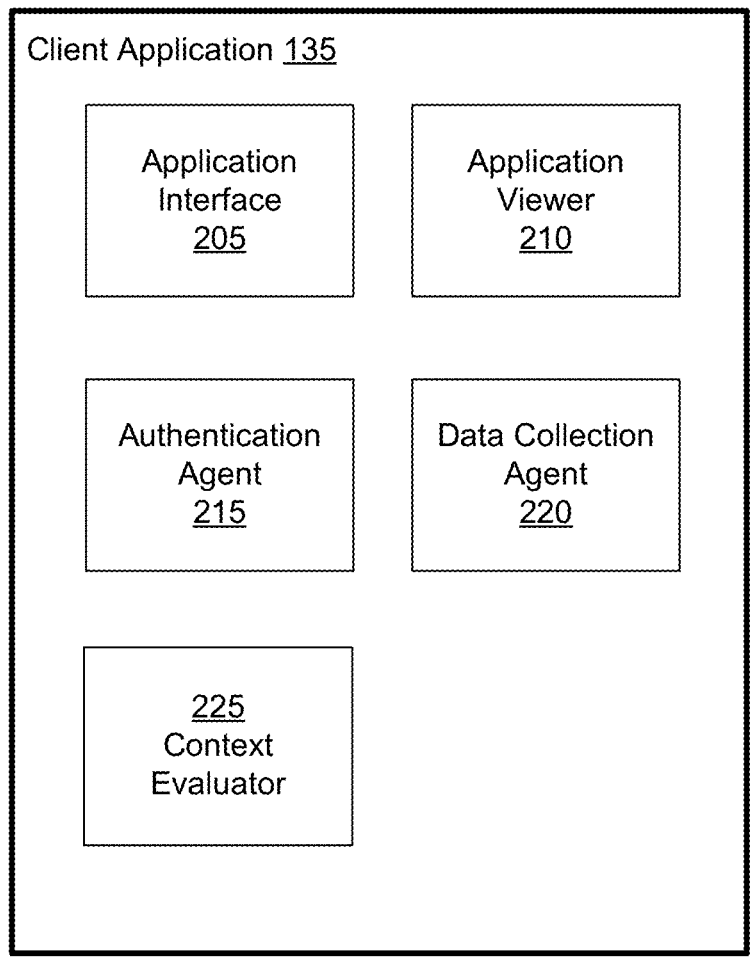
FIG. 2 is a block diagram illustrating system architecture of a client, according to one embodiment.

FIG. 2 is a block diagram illustrating system architecture of a client, according to one embodiment. In one embodiment, the client application 135 comprises an application interface 205, an application viewer 210, an authentication agent 215, a data collection agent 220, and a context evaluator 225. Other embodiments may include more, less, or different components. Furthermore, functionality described herein may be implemented by modules other than those indicated in the description herein.

The application interface 205 allows access to applications 115 in the enterprise 100 or SaaS hosting system 110. In one embodiment, the application interface 205 receives addresses of the applications 115 from the access control system 120, and uses the received addresses to access the applications 115. If the application 115 is hosted within the data center of the enterprise, the application interface 205 uses data channels, for example, networks of the enterprise to access the application. If the client device is located outside the firewall of the enterprise, the application interface 205 may use a VPN connection to access the application 115 within the enterprise. If the application 115 is hosted by a SaaS hosting system, the application interface 205 uses networks outside the enterprise to access the application.

The application viewer 210 displays application data associated with the applications 115. In one embodiment, the client application 135 executes a plurality of application viewers 210, each configured to display different types of data. For example, the application viewer 210 may be one or more of a PDF viewer, web browser or HTML viewer, application-specific viewers, or viewers for other data types.

The authentication agent 215 authenticates client access to the applications 115. In one embodiment, the authentication agent 215 authenticates application access based on authentication policies received from the access control system 120. In one embodiment, the authentication agent 215 stores user login credentials for the applications 115. The authentication agent 215 may encrypt the stored credentials. When a user requests access to an application 115, the authentication agent 215 decrypts the stored credentials and sends the credentials to the data center 105 or SaaS hosting system 110 for authentication. In this case, the authentication agent 215 automatically logs a user in to the data center 105 or SaaS server 110 without the user manually entering credentials each time the user accesses an application. In other cases, the authentication agent 215 uses other information additional to or different from the stored credentials to authenticate access, such as manually-entered credentials, biometric identification of the user, an authentication code sent to the client device 130, and so forth. In an embodiment, the authentication agent 215 uses the authentication mechanisms that are specific to certain client device types including but not limited to, username/password, hardware tokens, biometric, smart-cards/common access cards (CAC), voice recognition, face recognition, eye recognition, pattern locks (e.g., Android™ lock screen pattern lock), one time passwords (OTP), and so on.

The data collection agent 220 collects data from the client device 130 describing interactions of the client application 135 with the applications 115. The data collection agent 220 may collect data when a user requests access to an application as well as throughout the user's interactions with the application. The collected data includes, for example, an identifier of the user requesting access, the application being requested, an identifier of the client device 130, the location of the device 130 (e.g., geolocation or IP address), and the time of the request. The data collection agent 220 may also collect user experience data, such as response time of the applications or error codes. The data collection agent 220 sends the collected data to the access control system 120 for analysis.

The context evaluator 225 determines the context in which the client device is operating. The context of the client device describes the attributes of the current operation of the client device. For example, the same device may be used from different locations. The context evaluator 225 monitors changes in the attributes of the context of the client device. In an embodiment, the context evaluator 225 periodically checks if an attribute of the context has changed, for example, by monitoring changes in the location of the device.

Some of the attributes of the context may change more frequently than other attributes. For example, the location of the client device is likely to change at a higher frequency than the company for which the client device is being used. The frequency with which the context evaluator 225 checks whether an attribute has changed may depend on the type of attribute. In some embodiments, other applications may send a signal to the context evaluator 225 when an attribute of the context changes. If the context of the client device changes, the context evaluator 225 sends the new context to the IT management system.

Figure 3:
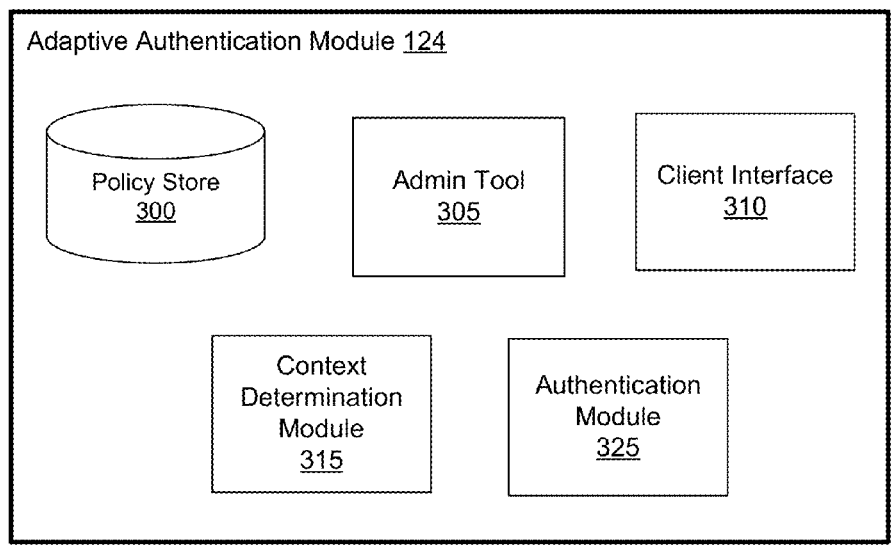
FIG. 3 is a block diagram illustrating modules within an adaptive authentication module, according to one embodiment.

FIG. 3 is a block diagram illustrating modules within the adaptive authentication module 124 of the access control system 120, according to one embodiment. In one embodiment, the adaptive authentication module 124 comprises a policy store 300, an admin tool 305, a client interface 310, a context determination module 315, a context learning module 320, and an authentication module 325. Other embodiments may include more, less, or different components. Furthermore, functionality described herein may be implemented by modules other than those indicated in the description herein.

The policy store 300 stores a plurality of access control policies. An access control policy may be associated with an enterprise 100. The access control policy may include information describing access to an application. In one embodiment, the access control policy specifies a type of access control for a type of user in each of a plurality of contexts. The user types may be defined groups of users specified by an administrator or an automatic categorization of users based on the users' roles in the enterprise 100 or other factors. For example, an administrator of the enterprise 100 specifies a group of users. In one embodiment, an access control policy is a set of security rules, which collectively define the type of access control required for a given context.

In some embodiments, an access control policy may be represented using the syntax of a custom language that is processed by the access control system and by the client device. In other embodiments, an access control policy is represented using a markup language, for example, an extensible markup language (XML) syntax.

The security rules include authentication rules that specify a procedure for authenticating access to an application 115. Example authentication procedures include authentication using stored user credentials, authentication using manually-entered user credentials, two-factor authentication, biometric authentication, and so on. For example, an access control policy may specify that the client application 135 can authenticate access to an application using locally-stored user credentials. Alternatively, the access control policy may specify that the user is required to answer one or more challenge questions to get access to the application. The access control policy may also specify that no credentials are required to access an application.

Behavioral rules specify preconditions that must be satisfied for a client device to allow a certain action. For example, for a particular context, a client application may be allowed to perform an action A1 but not allowed to perform action A2, whereas for another context, the client application may be allowed to perform action A2 but not action A1, and for yet another context, the client application may be allowed to perform both actions A1 and A2. As another example, a behavioral rule may specify whether for a given context, a user can print pages of content from the applications or capture screenshots, and whether the client application 135 can cache content and access particular networks or websites. For example, a policy may specify that for a user of a particular user type, the client device 130 can cache up to 100 MB of application data, whereas for users of another user type, the client device 130 can cache up to 500 MB of application data.

In an embodiment, a policy is associated with a context in which the policy is applicable. In this case, the policy is applied when the request for access is received in the context corresponding to the policy. Other policies may be associated with a learned contextual model for a user. In this case, one policy is applied when the client application 135 is operated in contexts fitting the contextual model, and a different policy is applied when the client's context deviates from the model. Multiple policies may be defined for each type of user. Thus, each user type may be associated with a set of policies defining a set of security rules applicable for each of a plurality of contexts.

The admin tool 305 provides an interface for defining access control policies. In one embodiment, the access control policies for the enterprise 100 are created by an administrator or IT professional associated with the enterprise 100. For example, an administrator of the enterprise 100 interacts with the admin tool 300 to define access control policies for the enterprise 100. Embodiments allow an enterprise to specify various scenarios for access control based on various contexts in which requests to applications may be sent.

The client interface 310 communicates between the access control system 120 and the client application 135. The client interface 310 receives data collected by the data collection agent 220 and transmits information for accessing applications 115 to the client application 135, including the addresses of the applications 115 and the authentication information.

The context determination module 315 uses data collected by the client applications 135 to determine the context in which the client device 130 is operating. In one embodiment, the context determination module 315 receives the context from the client application 135. In another embodiment, the context determination module 315 generates a contextual model specifying expected contexts of the client application 135.

In one embodiment, the context determination module 315 monitors a user's contexts to determine patterns in the user's behaviors. These patterns may include information about which applications 115 the user typically accesses from certain locations and/or at certain times or typical actions performed by the user with respect to an application 115. For example, the contextual model for a user may indicate that a user typically accesses applications from an IP address associated with the enterprise 100 between 8 am and 5 pm, and accesses applications from an IP address of the user's home network between 5 pm and 8 pm. Another model may indicate that a user often prints content from a particular application.

The authentication module 325 determines an applicable policy based on the context. When a user requests access to an application 115 via a client application 135, the authentication module 325 receives the context and an identifier of the user. The authentication module 325 uses the identifier of the user to determine which policies in the policy store 300 are associated with the user. For example, the authentication module 325 determines a user group to which the user belongs and selects the policies associated with the user group. Based on the context of the client application 135, the authentication module 325 determines the applicable policy.

In one embodiment, the authentication module 325 selects the policy corresponding to the user's context. For example, if a security policy specifies security rules when a user is in a particular geographic location, the authentication module 325 selects the policy when the user's client device 130 is in that geographic location. In another embodiment, the authentication module 325 determines the policy based on a deviation of the client application's context from the contextual model. For example, the authentication module 325 applies a low-security policy when the context matches the contextual model. If a user accesses an application from a location not predicted by the user's contextual model, the authentication module 325 applies a higher security policy. After determining the applicable policy for the context, the authentication module 325 sends the corresponding security rule to the client application 135, which uses the security rules to authenticate and manage access to the applications 115.

Figure 4:
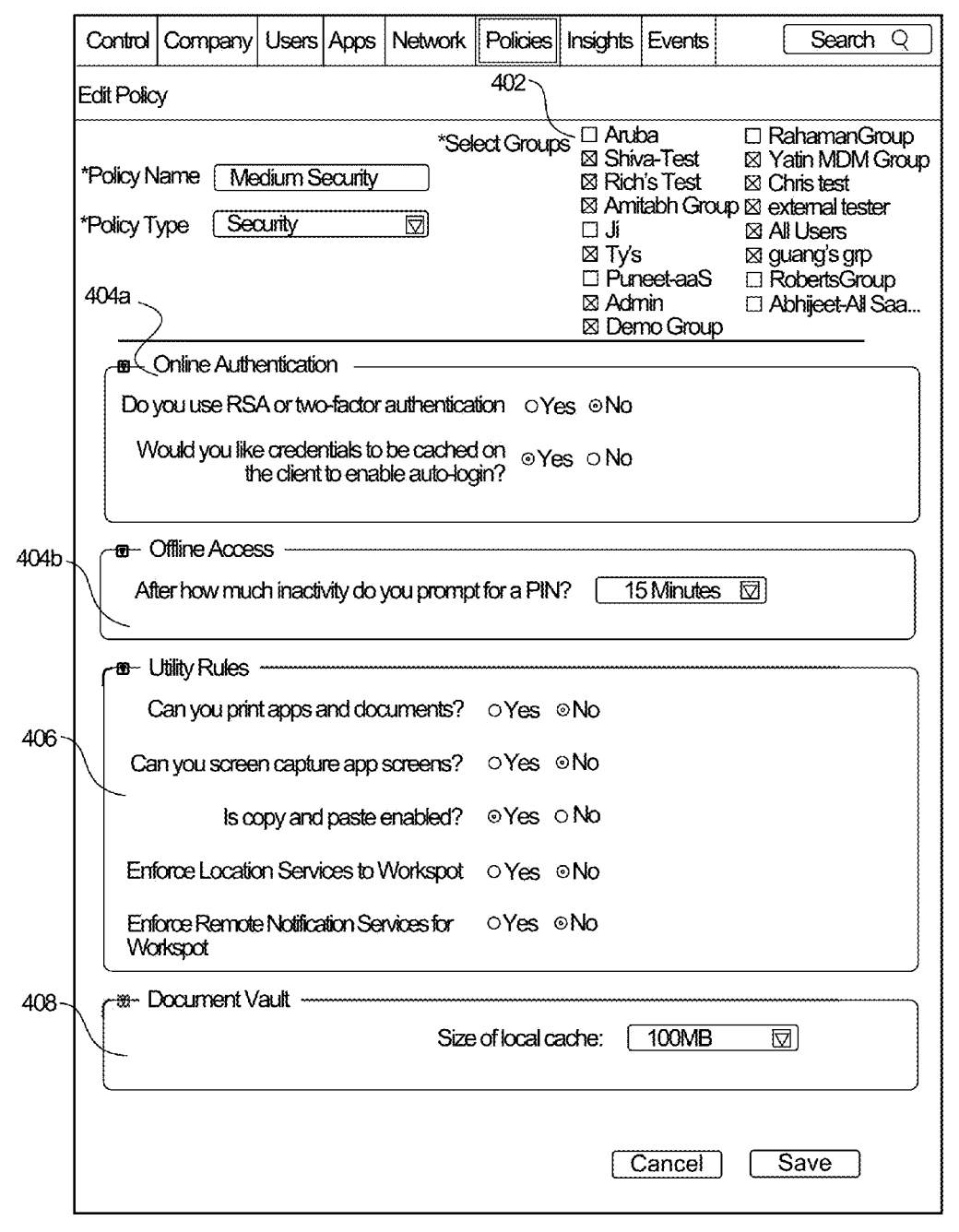
Figure 5:
FIG. 5 is a user interface for defining or editing a geographic policy, according to one embodiment.

As described above, an administrator of the enterprise 100 defines security policies for various groups of users associated with the enterprise 100. FIGS. 4-5 illustrate example user interfaces for creating policies. In one embodiment, the interfaces illustrated in FIGS. 4-5 are generated by the admin tool 305 of the access control system 120 and displayed to the administrator via a computing device, such as the client device 130.

A security rules interface as shown in FIG. 4 allows the administrator to define or edit an access control policy's security rules. Selection boxes 402 identify user groups associated with the enterprise 100. By selecting one or more of the selection boxes 402, the administrator defines which user groups are to be associated with the security rules. The interface also provides various options for authentication procedures 404, include procedures 404a for online authentication and procedures 404b for offline authentication.

As shown in FIG. 4, the online authentication procedures 404a allow an administrator to select whether RSA or two-factor authentication is required for accessing an application. The administrator can also select whether the client application 135 is allowed to cache user credentials for automatic login. The offline authentication procedures 404b allow the administrator to specify a time of inactivity allowed before prompting the user to log in again to the client application 135 (e.g., by entering a PIN). The security rules interface may provide additional or alternative authentication procedures for selection by the administrator.

The security rules interface shown in FIG. 4 also illustrates a set of options 406 for specifying behavioral rules. An administrator uses the options 406 to specify, for example, whether printing, screen capture, and copy and paste are allowed. The administrator can also select, using menu 408, an allowable cache size on the client device 130. In other embodiments, the security policy interface includes options for specifying other behavioral rules than those illustrated in FIG. 4.

FIG. 5 illustrates an interface for associating the security rules with a context. In the example shown in FIG. 5, the context is a geographic location. However, similar interfaces may be provided for the administrator to associated security rules with other contextual variables. The interface includes selection boxes 502, at which the administrator defines which user groups are to be associated with the policy. To define a location in which the policy is applicable, the administrator selects one or more countries using country selection box 504. The geographic policy interface may alternatively provide options for specifying locations by other geographic entities, such as cities, counties, ZIP codes, IP addresses, and so forth. The administrator associates the geographic policy with a set of security rules using menu 506.

Figure 6:
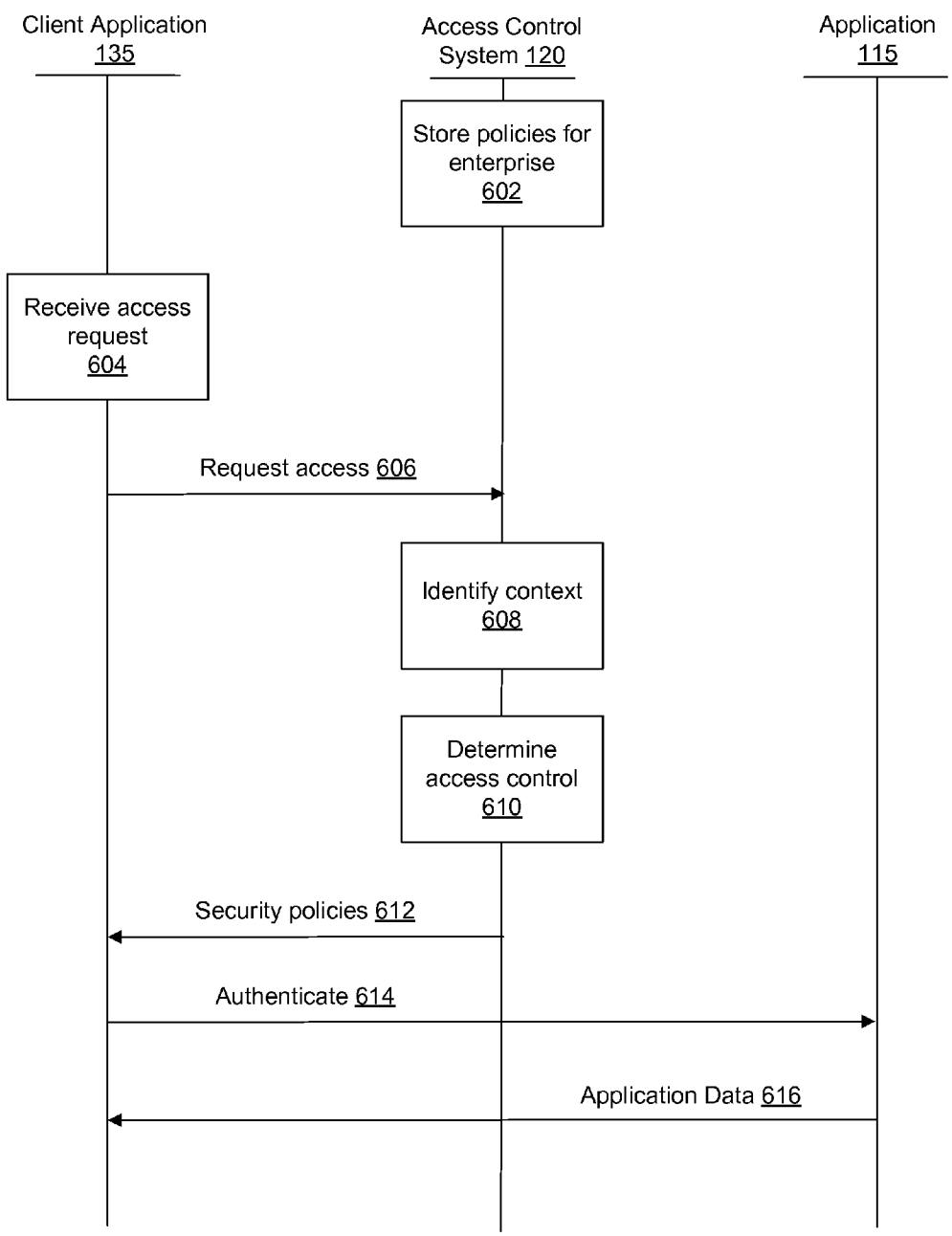
FIG. 6 is an interaction diagram illustrating a process for adaptive authentication, according to one embodiment.

FIG. 6 illustrates a process for adaptive authentication, according to one embodiment. In one embodiment, the process comprises interactions between the client application 135, the access control system 120, and an application 115. The application 115 may be an application hosted by the enterprise 100 or the SaaS hosting system 110. In the diagram, time flows from top to bottom, and horizontal arrows represent communications between the entities.

The access control system 120 stores 602 access control policies for an enterprise, where the policies specify a type of access control for a type of user in a corresponding context. Each user type may be associated with a set of access control policies defining a set of security rules applicable for each of a plurality of contexts.

The client application 135 receives 604 a request from a user to access the application 115. In response, the client application 135 requests 606 access from the access control system 120. The request 606 includes information about a context of the client application 135. Using the information provided in the request 606, the access control system 120 identifies 608 the context. Based on the stored policies, the access control system 120 determines 610 a security policy for the identified context. The security policy includes a set of security rules, defining a type of access control required for the client application's context.

The access control system 120 sends 612 the security rules to the client application 135 corresponding to the security policy determined for the context. Using the authentication information, the client application 135 communicates with the application 115 to authenticate 614 access to the application 115. Once authenticated, the application 115 sends requested application data to the client application 135 for display to the user.

In some embodiments, the access control system may require additional authentication over and above the authentication that is required by the application if the user could directly connect to the application. For example, the application may require the user to provide a user and password for login. However, the access control system may require a user in certain context to solve additional challenge questions that are not required by the application. For example, an enterprise may require additional authentication for a SaaS application that are not required by other enterprises.

Similarly, the access control system may store default credentials for an application and may require less rigorous authentication in certain contexts. For example, an employee may be required to provide credentials to be able to use an application when the employee is working from home. However, when the employee's location changes to a building at work, the client device provides the new context to the access control system. The access control system uses a different access control policy based on the new context and uses the default credentials stored with the access control system and allows the employee to interact with the application without requiring the employee to provide any credentials.

Embodiments can be used for changing the access control policies based on changes in the context in which a request is sent by a client device. As an example, a user may be travelling from one location to another as the user interacts with applications associated with his enterprise. As the location of the client device changes, the context evaluator 225 detects the location change and sends an updated context to the access control system 120. The access control system 120 may send a different set of access control information to the client device for subsequent requests received from the device. For example, if the client device requests access to an application in the new location, more rigorous authentication may be required for an application compared to the previous location. Furthermore, certain types of actions that may be allowed by an application in the previous location may be disallowed from the new location.

As another example, an employee may be working while commuting to work, for example, via public transportation. When the employee is away from his work location, authentication may be required when the employee access a particular application. However, when the employee enters a location of the enterprise, for example, when the employee enters a building of the enterprise, the access control system may not require any authentication to access the same application.

In some embodiments, the status of an employee may be specified as an attribute of the context. The access control system may change the access control policy applicable to the employee when the status of the employee changes. For example, assume that the employee is initially employed as a contractor. The context based policy selected for this employee status by the access control system may require rigorous authentication for accessing certain application. However, if the status of the employee is changed from contractor to a full-time employee of the enterprise, the client application 135 of the client device may be updated to provide the new status of the employee along with the context sent to the access control system. The access control system receives the new context with the updated employee status and accordingly modifies the access control policy applicable to the employee. For example, according to the new employee status, the access control system may not require rigorous authentication for certain applications.

In some embodiments, the access control policy is determined by the time the request is sent. For example, an enterprise may require additional authentication at certain times compared to other times of the day, or require different authentication based on days of the week or change the authentication based on a predefined schedule. For example, certain event associated with the enterprise such as a merger or acquisition may cause access control policies to change. Similarly, for a particular event occurring within a time interval, the access control system may provide temporary access to certain applications to a set of users. A system administrator of the enterprise can change the access control policy based on the time information in the context. The value of time received in the context from the client device may be different from the time of the server running the application since the client device and the server may be in different time zones.

In some embodiments, the access control system may determine access control policies based on client device type. For example, certain types of client devices may be considered more prone to unauthorized use, thereby requiring additional authentication. Furthermore, the type of access control may be customized to particular types of devices. For example, a mobile phone may be able to provide information specific to the phone that allows authentication that may not be possible for other devices. Accordingly, the type of authentication mechanism required may be determined based on the client device type received from the context.

In an embodiment, the context provides only the client device ID and the access control stores mechanisms to map client device IDs to client device types. For example, the access control system may store a mapping from client device ID to client device type. Alternatively, the access control system may receive additional information from the client device to determine the type of the client device. As another example, if a security hazard is identified for a particular client device type or operating system executing on the client device, the access control system may appropriately restrict access to certain applications for those device types or operating systems.

In some embodiments, the context received by the access control system may include information describing a version or release of a software running on the client device. The access control system may determine the access control policy used for a request based on the version or release of software running on the client device. For example, the access control policy for certain versions of operating system may be different from other versions. Similarly, the access control policy may be based on whether a particular patch of a software, for example, an operating system is installed on the client device. The access control policy may also be based on the version or release of a particular client application installed on the client device. For example, if an application requires a custom client application to execute the application, the access control for client devices that have installed an older version of the client application may be different from client devices that have installed a newer version.

In some embodiments, the context received by the access control system may include a request type for the request sent for accessing the application. The access control system may determine the access control policy based on the request type of the context. For example, the access control system may impose additional authentication for requests that update a user profile information for an application as compared to requests that simply retrieve information. This access control policy may be imposed in addition for the access control required by the application itself. For example, a SaaS application may not meet the standard of authentication required by an enterprise and the enterprise may require additional authentication for specific requests.

The ability to specify a request type in the context and select an access control policy based on a request type allows a system administrator to control access to specific features or actions within an application. For example, an action control policy can specify that an action of certain type within an application can be performed only by client devices having a location within a particular region. For example, the access control system can be used to define an access control policy that allows users to share a document with another user using the application only if the user is within a building of the offices of the enterprise. Alternatively, a particular type of action may be allowed only during specific times. For example, an action that requires a large data transfer can be performed only during certain times of the day. The access control policy for an enterprise can be implemented independent of the access control policies supported by the application. For example, an application may allow all actions once the user provides proper authentication to be able to login to the application. However, the access control system allows system administrators to restrict the actions performed by different users based on user type, location, time or any other attribute of a context. Furthermore, each enterprise can implement a different access control policy, for example, a first enterprise may enable a first set of actions during a time interval whereas a second enterprise may enable a second set of actions during the same time interval or the first set of action during a different time interval.

In some embodiments, the context received by the access control system may include information describing one or more parameters for certain types of requests sent for accessing the application. The access control system may determine the access control policy based on the values of the request parameters. For example, a request may retrieve certain type of confidential requests if a particular flag is set as a request parameter. The access control system may require additional authentication for requests of that particular type if the request parameter value satisfies certain criteria, for example, if the request parameter value is within a range or belongs to a set of values or is equal to a specific value. As an example, the access control system can be used to specify an access control policy based on a parameter of a request that specifies a size of data being transferred. The access control policy may specify that if the size of the data being transferred exceeds a threshold value, the action may be performed only during certain time periods, for example, outside peak working hours.

Alternative Embodiments

It is to be understood that the Figures and descriptions of the present invention have been simplified to illustrate elements that are relevant for a clear understanding of the present invention, while eliminating, for the purpose of clarity, many other elements found in a typical IT management system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    storing, by an access control system, action control policies for a plurality of enterprises, wherein the access control system is external to each of the plurality of enterprises;
    storing, by the access control system, action control policies for the plurality of enterprises as a mapping from contexts of requests to the action control policies, each context specifying one or more attributes describing a request received from a client device, wherein the request is for an action performed by an application hosted by a software as a services (SaaS) hosting system, each action control policy identifying actions that the client device is allowed in a given context;
    receiving, by the access control system, from a first client device, a first request for interacting with the application hosted by the SaaS hosting system, the first request providing information describing a first context;
    identifying a first enterprise from the plurality of enterprises, the first enterprise associated with the first client device;
    determining, by the access control system, a first action control policy associated with the first enterprise for the first context based on the mapping, the first action control policy allowing a first set of actions supported by the application;
    sending information describing the first action control policy to the first client device for enforcement of the first action control policy by an agent executing on the first client device;
    receiving from a second client device, a second request for interacting with the application hosted by the SaaS hosting system, the second request providing information describing a second context;
    identifying a second enterprise from the plurality of enterprises, the second enterprise associated with the second client device;
    determining a second action control policy associated with the second enterprise for the second context based on the mapping, the second action control policy allowing a second set of actions supported by the application; and
    sending information describing the second action control policy to the second client device for enforcement of the second action control policy by the agent executing on the second client device.

2. The method of claim 1, wherein the first context comprises one or more of a user identifier, the application, and a time of the first request.

3. The method of claim 1, wherein the first context comprises one or more of a request type and a parameter of the request.

4. The method of claim 1, wherein determining the first action control policy comprises:
    receiving an identifier of a user associated with the first request;
    determining a user type of the user; and
    selecting the first action control policy based on the user type of the user.

5. The method of claim 1, wherein determining the first action control policy comprises:
    generating a contextual model identifying expected contexts of the client device;
    comparing the context to the contextual model; and
    determining the first action control policy based on a deviation of the context from the contextual model.

6. The method of claim 1, wherein the first action control policy specifies a first cache size for storing data associated with the application and the second action control policy specifies a second cache size for storing data associated with the application.

7. The method of claim 1, wherein the application requires a first authentication process for allowing access to the application and the first control policy requires an additional authentication process distinct from the first authentication process for allowing access to the application.

8. The method of claim 1, wherein the allows a user to perform a set of actions if the application successfully authenticates the user, whereas the first action control policy restricts the actions allowed to the user to a subset of the set of actions based on the first context.

9. The method of claim 1, further comprising:
receiving information indicating a change in a particular action control policy associated with the first enterprise effective from a particular time; and
determining a time value associated with the first request; and
determining whether the changed action control policy is applicable to the first request based on the time value associated with the first request.

10. The method of claim 1, wherein the first action control policy includes information identifying a parameter of the first request, wherein the access control system allows the first client device to take a particular action of the application if the identified parameter of the first request satisfies a predetermined criteria.

11. The method of claim 1, wherein the first action control policy includes information identifying a parameter of the first request, wherein the access control system allows the first client device to take a particular action of the application if the identified parameter of the first request is determined to be within a predetermined set of values.

12. The method of claim 1, wherein the first action control policy includes information identifying a parameter of the first request, wherein the access control system requires additional authentication if the identified parameter of the first request satisfies a predefined criteria.

13. A system comprising:
a computer processor; and
a non-transitory computer readable storage medium storing computer program instructions, the instructions when executed by the computer processor causing the computer processor to perform steps comprising:
storing, by an access control system, action control policies for a plurality of enterprises, wherein the access control system is external to each of the plurality of enterprises;
storing action control policies for the plurality of enterprises as a mapping from contexts of requests to the action control policies, each context specifying one or more attributes describing a request received from a client device, wherein the request is for an action performed by an application hosted by a software as a services (SaaS) hosting system, each action control policy identifying actions that the client device is allowed in a given context;
receiving from a first client device, a first request for interacting with the application hosted by the SaaS hosting system, the first request providing information describing a first context;
identifying a first enterprise associated with the first client device based on the first request;
determining a first action control policy associated with the first enterprise for the first context based on the mapping, the first action control policy allowing a first set of actions supported by the application;
sending information describing the first action control policy to the first client device for enforcement of the first action control policy by an agent executing on the first client device;
receiving from a second client device, a second request for interacting with the application hosted by the SaaS hosting system, the second request providing information describing a second context;
identifying a second enterprise associated with the second client device based on the second request;
determining a second action control policy associated with the second enterprise for the second context based on the mapping, the second action control policy allowing a second set of actions supported by the application; and
sending information describing the second action control policy to the second client device for enforcement of the second action control policy by the agent executing on the second client device.

14. The system of claim 13, wherein the first action control policy comprises one or more of a user identifier, the application, and a time of the first request.

15. The system of claim 13, wherein the first context comprises one or more of a request type, and a parameter of the request.

16. The system of claim 13, wherein determining the first action control policy comprises:
receiving an identifier of a user associated with the first request;
determining a user type of the user; and
selecting the first action control policy based on the user type of the user.

17. The system of claim 13, wherein determining the first action control policy comprises:
generating a contextual model identifying expected contexts of the client device;
comparing the context to the contextual model; and
determining the action control policy based on a deviation of the context from the contextual model.

18. A non-transitory computer readable storage medium storing computer program instructions, the instructions when executed by a processor causing the processor to perform steps comprising:
storing, by an access control system, action control policies for a plurality of enterprises, wherein the access control system is external to each of the plurality of enterprises;
storing, by the access control system, action control policies for the plurality of enterprises as a mapping from contexts of requests to the action control policies, each context specifying one or more attributes describing a request received from a corresponding client device, wherein the request is for an action performed by an application hosted by a software as a services (SaaS) hosting system, each action control policy identifying actions that the client device is allowed in a given context;
receiving, by the access control system, from a first client device, a first request for interacting with the application hosted by the SaaS hosting system, the first request providing information describing a first context;
identifying a first enterprise from the plurality of enterprises, the first enterprise associated with the first client device;
determining, by the access control system, a first action control policy associated with the first enterprise for the first context based on the mapping, the first action control policy allowing a first set of actions supported by the application;
sending information describing the first action control policy to the first client device for enforcement of the first action control policy by an agent executing on the first client device;

receiving from a second client device, a second request for interacting with the application hosted by the SaaS hosting system, the second request providing information describing a second context;

identifying a second enterprise from the plurality of enterprises, the second enterprise associated with the second client device;

determining a second action control policy associated with the second enterprise for the second context based on the mapping, the second action control policy allowing a second set of actions supported by the application; and sending information describing the second action control policy to the second client device for enforcement of the second action control policy by the agent executing on the second client device.

* * * * *